(12) United States Patent
Alexopoulos et al.

(10) Patent No.: US 8,606,207 B2
(45) Date of Patent: Dec. 10, 2013

(54) FRACTAL CURVE BASED FILTER

(75) Inventors: Nicolaos G. Alexopoulos, Irvine, CA (US); Seunghwan Yoon, Costa Mesa, CA (US)

(73) Assignee: Broadcom Corporation, Irvine, CA (US)

( * ) Notice: Subject to any disclaimer, the term of this patent is extended or adjusted under 35 U.S.C. 154(b) by 501 days.

(21) Appl. No.: 13/031,562

(22) Filed: Feb. 21, 2011

(65) Prior Publication Data

US 2011/0150140 A1  Jun. 23, 2011

Related U.S. Application Data

(63) Continuation-in-part of application No. 12/642,360, filed on Dec. 18, 2009.

(60) Provisional application No. 61/316,004, filed on Mar. 22, 2010.

(51) Int. Cl.
*H04B 1/10* (2006.01)
(52) U.S. Cl.
USPC .......................... 455/307; 455/339; 333/191
(58) Field of Classification Search
USPC .................. 455/307, 339, 286, 306, 213; 333/191–193, 204
See application file for complete search history.

(56) References Cited

U.S. PATENT DOCUMENTS

| | | | | |
|---|---|---|---|---|
| 3,787,612 | A * | 1/1974 | DeVries et al. | 455/259 |
| 6,150,898 | A * | 11/2000 | Kushitani et al. | 333/110 |
| 7,417,869 | B1 * | 8/2008 | Lam | 361/763 |
| 2002/0021194 | A1 * | 2/2002 | Maehara et al. | 333/193 |
| 2005/0093661 | A1 * | 5/2005 | Gomez et al. | 333/204 |
| 2006/0006965 | A1 * | 1/2006 | Ishii | 333/191 |
| 2007/0236406 | A1 * | 10/2007 | Wen et al. | 343/909 |
| 2009/0273527 | A1 * | 11/2009 | Behdad | 343/705 |
| 2010/0019988 | A1 * | 1/2010 | Kim et al. | 343/911 R |
| 2011/0057742 | A1 * | 3/2011 | Frye et al. | 333/26 |
| 2012/0154231 | A1 * | 6/2012 | Puente Baliarda et al. | 343/752 |
| 2012/0249380 | A1 * | 10/2012 | Soler Castany et al. | 343/702 |

OTHER PUBLICATIONS

Crnojevic-Bengin, Vesna and Budimir, Djuradj; "Novel 3D Hilbert Microstrip Resonators"; Microwave and Optical Technology Letters; vol. 46, No. 3; Aug. 5, 2005; pp. 195-197.

* cited by examiner

*Primary Examiner* — Christian Hannon
(74) *Attorney, Agent, or Firm* — Garlick & Markison; Bruce E. Garlick

(57) ABSTRACT

A filter includes a first port, a second port, a first fractal curve based filter element coupled to the first port, and a second fractal curve based filter element coupled to the second port. The first fractal curve based filter element has first electromagnetic properties and the second fractal curve based filter element has second electromagnetic properties. The first fractal curve based filter element is electromagnetically coupled to the second fractal curve based filter element to filter radio frequency (RF) signals.

22 Claims, 13 Drawing Sheets

208

206

204

2nd MPC filter element

1st MPC filter element

2nd MPC filter element

1st MPC filter element

FRACTAL CURVE BASED FILTER

CROSS REFERENCE TO RELATED PATENTS

This patent application is claiming priority under 35 USC §119(e) to a provisionally filed patent application entitled, "Fractal Curve Based Filters", having a provisional filing date of Mar. 22, 2010, and a provisional Ser. No. 61/316,004, and is also claiming priority under 35 USC §120 as a continuation-in-part patent application of patent application entitled, "Antenna Structures and Applications Thereof", having a filing date of Dec. 18, 2009, and a Ser. No. 12/642,360, all of which are hereby incorporated herein by reference in their entirety and made part of the present U.S. Utility Patent Application for all purposes.

STATEMENT REGARDING FEDERALLY SPONSORED RESEARCH OR DEVELOPMENT—NOT APPLICABLE

INCORPORATION-BY-REFERENCE OF MATERIAL SUBMITTED ON A COMPACT DISC—NOT APPLICABLE

BACKGROUND OF THE INVENTION

1. Technical Field of the Invention

This invention relates generally to wireless communication systems and more particularly to components used within wireless communication devices of such wireless communication systems.

2. Description of Related Art

Communication systems are known to support wireless and wire lined communications between wireless and/or wire lined communication devices. Such communication systems range from national and/or international cellular telephone systems to the Internet to point-to-point in-home wireless networks. Each type of communication system is constructed, and hence operates, in accordance with one or more communication standards. For instance, wireless communication systems may operate in accordance with one or more standards including, but not limited to, IEEE 802.11, Bluetooth, advanced mobile phone services (AMPS), digital AMPS, global system for mobile communications (GSM), code division multiple access (CDMA), local multi-point distribution systems (LMDS), multi-channel-multi-point distribution systems (MMDS), radio frequency identification (RFID), Enhanced Data rates for GSM Evolution (EDGE), General Packet Radio Service (GPRS), WiMAX, extensions, and/or variations thereof.

Depending on the type of wireless communication system, a wireless communication device, such as a cellular telephone, two-way radio, personal digital assistant (PDA), personal computer (PC), laptop computer, home entertainment equipment, RFID reader, RFID tag, et cetera communicates directly or indirectly with other wireless communication devices. For direct communications (also known as point-to-point communications), the participating wireless communication devices tune their receivers and transmitters to the same channel or channels (e.g., one of the plurality of radio frequency (RF) carriers of the wireless communication system or a particular RF frequency for some systems) and communicate over that channel(s). For indirect wireless communications, each wireless communication device communicates directly with an associated base station (e.g., for cellular services) and/or an associated access point (e.g., for an in-home or in-building wireless network) via an assigned channel. To complete a communication connection between the wireless communication devices, the associated base stations and/or associated access points communicate with each other directly, via a system controller, via the public switch telephone network, via the Internet, and/or via some other wide area network.

For each wireless communication device to participate in wireless communications, it includes a built-in radio transceiver (i.e., receiver and transmitter) or is coupled to an associated radio transceiver (e.g., a station for in-home and/or in-building wireless communication networks, RF modem, etc.). As is known, the receiver is coupled to an antenna and includes a low noise amplifier, one or more intermediate frequency stages, a filtering stage, and a data recovery stage. The low noise amplifier receives inbound RF signals via the antenna and amplifies then. The one or more intermediate frequency stages mix the amplified RF signals with one or more local oscillations to convert the amplified RF signal into baseband signals or intermediate frequency (IF) signals. The filtering stage filters the baseband signals or the IF signals to attenuate unwanted out of band signals to produce filtered signals. The data recovery stage recovers raw data from the filtered signals in accordance with the particular wireless communication standard.

As is also known, the transmitter includes a data modulation stage, one or more intermediate frequency stages, and a power amplifier. The data modulation stage converts raw data into baseband signals in accordance with a particular wireless communication standard. The one or more intermediate frequency stages mix the baseband signals with one or more local oscillations to produce RF signals. The power amplifier amplifies the RF signals prior to transmission via an antenna.

The filtering stage(s) of the receiver section and/or of the transmitter section may include low pass filters, high pass filters, and/or band pass filters. Such filters may be implemented with discrete components (e.g., capacitors, resistors, inductors) or may be implemented using a microstrip. An issue with a microstrip filter is its footprint (i.e., the space it consumes on a printed circuit board, integrated circuit substrate, and/or integrated circuit die). One technique to reduce the footprint of a microstrip filter is to use a Hilbert shape. While this technique reduces the footprint of a microstrip filter, there is room for further reduction.

Therefore, a need exists for a fractal curve based filter for use in communication devices and other electronic devices.

BRIEF SUMMARY OF THE INVENTION

The present invention is directed to apparatus and methods of operation that are further described in the following Brief Description of the Drawings, the Detailed Description of the Invention, and the claims. Other features and advantages of the present invention will become apparent from the following detailed description of the invention made with reference to the accompanying drawings.

BRIEF DESCRIPTION OF THE SEVERAL VIEWS OF THE DRAWING(S)

DETAILED DESCRIPTION OF THE INVENTION

Figure 1:
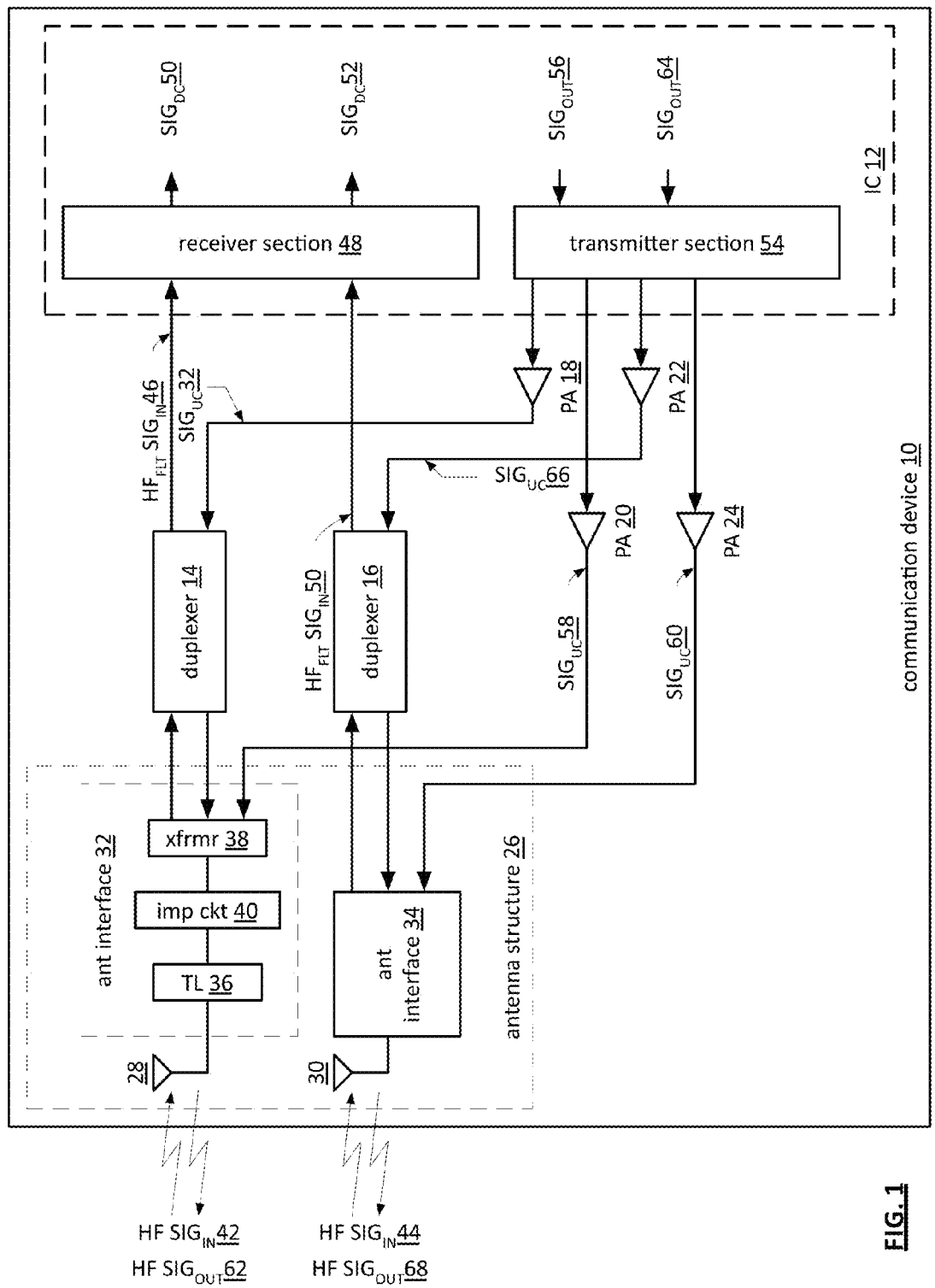
FIG. 1 is a schematic block diagram of an embodiment of a communication device in accordance with the present invention.

FIG. 1 is a schematic block diagram of another embodiment of a high frequency (HF) communication device 10 includes an IC 12, a first duplexer 14, a second duplexer 16, a plurality of off-chip power amplifiers (PA) 18-24, and the antenna structure 26. In an embodiment, the antenna structure 26 includes one or more antennas 28-30 (two shown) and one or more antenna coupling circuits 32-34 (two shown). For example, the antenna structure 26 may include an antenna for each frequency band the communication device supports; an antenna for each set of frequency bands the communication device supports (e.g., one antenna for frequency bands 800, 850, and 900 MHz, and a second antenna for frequency bands 1800, 1900, and 2100 MHz); a single antenna for all frequency bands supported by the communication device; or transmit and receive antennas for each frequency band or set of frequency bands the communication device supports. The antenna coupling circuit 32-34 may include a transmission line 36, a transformer balun 38, an impedance matching circuit 40, and/or an antenna switch.

The antenna structure 26 is operable to receive a first inbound HF signal 42 and a second inbound HF signal 44. The first inbound HF signal 42 is formatted in accordance with one of a first plurality of communication protocols (e.g., GSM 800/850, WCDMA Band V, etc.) and the second inbound HF signal 44 is formatted in accordance with one of a second plurality of communication protocols (e.g., GSM 1900, WCDMA Band II, etc.). In general, the first inbound HF signal 42 may be of any data modulation (e.g., GMSK, 2-GMSK, 4-GMSK, 8-PSK, MSK, FSK, ASK, etc.) for a given frequency band (e.g., 800/850 MHz) and the second inbound HF signal 44 may be of any data modulation (e.g., QPSK, QAM, BPSK, 8-PSK, etc.) for another frequency band (e.g., 1900 MHz).

When the antenna structure 26 receives the first inbound HF signal 42, it provides the signal 42 to the duplexer 14 and when it receives the second inbound HF signal 44, it provides the signal 44 to a second duplexer 16. The first duplexer 14 functions as previously discussed to filter the first inbound HF signal 42 to produce the filtered inbound HF signal 46. The receiver section 48 functions as previously discussed to convert the filtered inbound HF signal 46 into the first down converted signal 50.

The second duplexer 16, which may include a narrow band receive SAW (Surface Acoustic Wave) filter centered on the receive portion of the second frequency band and a narrow band transmit SAW filter centered on the transmit portion of the second frequency band, filters the second inbound HF signal 44 to produce a second filtered inbound HF signal 46. Each of the receive and transmit SAW filters may be one or more of the filters shown in FIGS. 6b, 6c, and 10-13.

The off-chip multiple protocol duplexer 16 filters the second inbound HF signal 44 in the same manner regardless of the signal's 44 format. For example, the duplexer 16 filters an inbound GSM formatted signal in the same manner that it filters an inbound WCDMA formatted signal.

The receiver section 48, which is operable in a receive portion of the second frequency band and supports the second plurality of communication protocols, converts the second filtered inbound signal 50 into a second down converted inbound signal 52 in accordance with the second plurality of communication protocols. As an example, if the second frequency band corresponds to 1900 MHz, then the second inbound HF signal 44 may be formatted in accordance with GSM 1900 or WCDMA Band II. In this example, the receiver section 48 receives the second filtered inbound HF signal 44 within the corresponding receive band of the second frequency band (e.g., 1850-1910 MHz UL, 1930-1990 MHz DL of GSM 1900 or 1930-1990 MHz UL, 1850-1910 MHz DL of WCDMA Band II) and converts it into the second down converted signal 52. The second down converted signal 52 may be at baseband or near baseband (e.g., has a carrier frequency of up to a few MHz).

The transmitter section 54 converts the first outbound signal 56 into the first up converted signal 58 when the first one of the multiple communication protocols (e.g., GSM 800/850) is active and converts the first outbound signal 56 into the second up converted signal 60 when the second one of the multiple communication protocols is active (e.g., WCDMA band V). When the first communication protocol is active, the transmitter section 54 provides the first up converted signal 58 as the outbound HF signal 62 to the antenna structure 28 via the power amplifier (PA) 20. When the second communication protocol is active, the transmitter section 54 provides the second up converted signal to the multiple protocol off-chip duplexer 14 via a PA 18.

The transmitter section 54 also converts a second outbound signal 64 into a third up converted signal 60 when a first one of a second multiple communication protocols (e.g., GSM 1900) is active and converts the second outbound signal 64 into a fourth up converted signal 66 when the second one of the second multiple communication protocols is active (e.g., WCDMA band II). When the first one of the second multiple of communication protocols is active, the transmitter section 54 provides the third up converted signal 60 as a second outbound HF signal 68 to the antenna structure 16 via the off-chip power amplifier (PA) 24. When the second one of the second multiple of communication protocols is active, the transmitter section 54 provides the fourth up converted signal 66 to the second multiple protocol off-chip duplexer 16 via a PA 22.

Note that each of the PAs 18-24 may be off-chip (i.e., not on IC 12) and includes one or more power amplifiers coupled in series and/or in parallel.

The duplexer 16 filters the fourth up converted signal 66 and provides the filtered up converted signal to the antenna structure 26 as the second outbound HF signal 68.

The antenna structure 26 transmits the second outbound HF signal 68 in a transmit portion of the second frequency band (e.g., 1850-1910 MHz UL of GSM 1900 and of WCDMA Band II). Note that the impedance circuit 40, the duplexers 14, 16, the receiver section 48, and/or the transmitter section 54 may include one or more filters (e.g., low pass, band pass, high pass filters) as described with reference to one or more of FIGS. 5-13.

Figure 2:
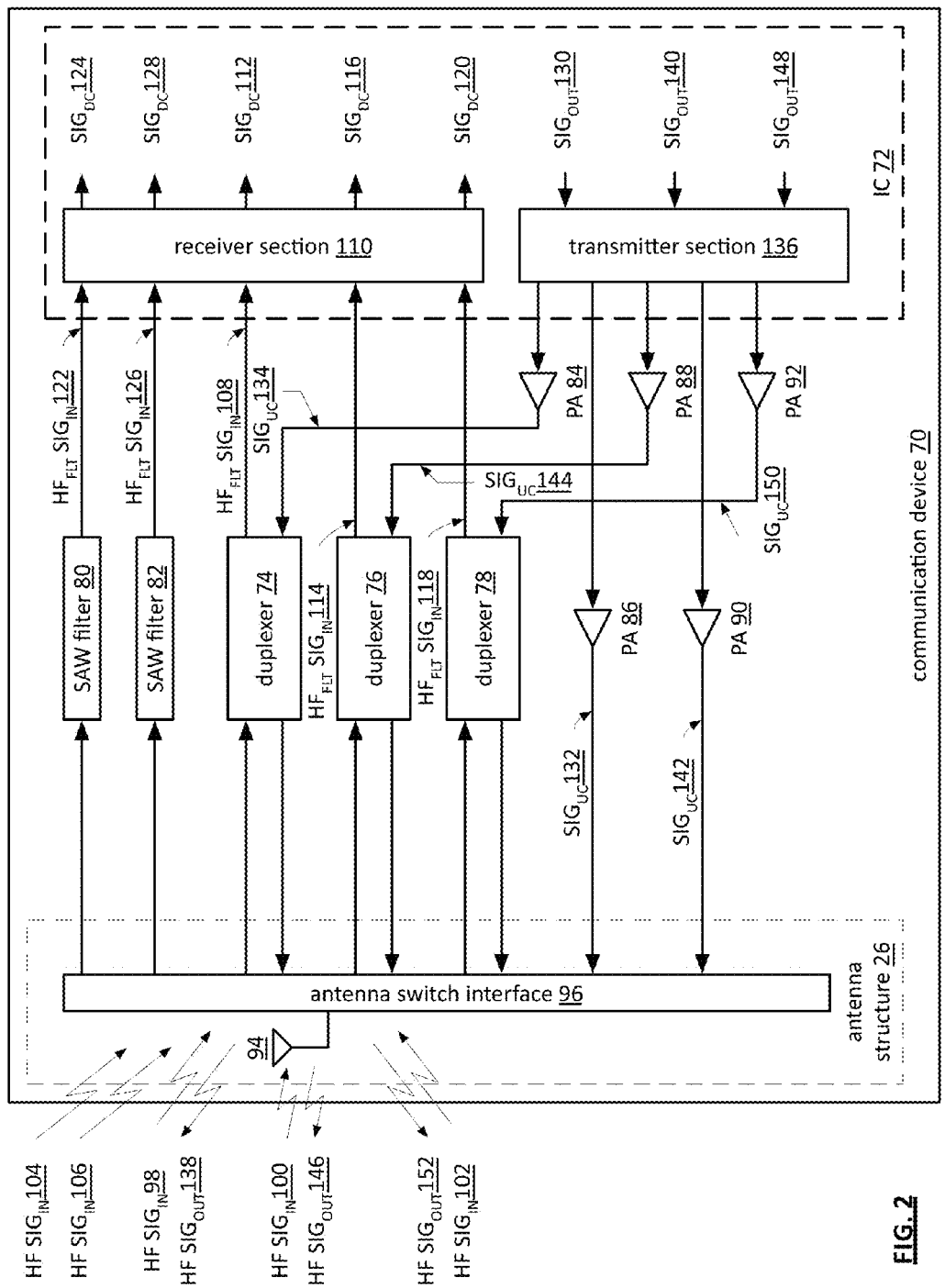
FIG. 2 is a schematic block diagram of another embodiment of a communication device in accordance with the present invention.

FIG. 2 is a schematic block diagram of another embodiment of at least a portion of a cell phone 70 includes an IC 72, a first duplexer 74, a second duplexer 76, a third duplexer 78, a first receiver SAW filter 80, a second receiver SAW filter 82, a plurality of off-chip power amplifiers (PA) 84-92, an antenna structure 26. In an embodiment, the antenna structure 26 includes one or more antennas 94 and an antenna switch 96, which may be one or more high frequency switches. The antenna structure 26 is operable to receive a first inbound HF signal 98, a second inbound HF signal 100, a third inbound HF signal 102, a fourth inbound HF signal 104, and/or a fifth inbound HF signal 106.

As an example, the first inbound HF signal 98 is formatted in accordance with one of a first plurality of communication protocols (e.g., GSM 800/850, WCDMA Band V, etc.), the second inbound HF signal 100 is formatted in accordance with one of a second plurality of communication protocols (e.g., GSM 1900, WCDMA Band II, etc.), the third inbound HF signal 102 is formatted in accordance with one of a third plurality of communication protocols (e.g., WCDMA BAND-III, WCDMA Band I), the fourth inbound HF signal 104 is formatted in accordance with one of a fourth plurality of communication protocols (e.g., GSM 900, GPRS 900, EDGE 900), and the fifth inbound HF signal 106 is formatted in accordance with one of a fifth plurality of communication protocols (e.g., GSM 1800, GPRS 1800, EDGE 1800). In general, the first inbound HF signal 98 may be of any data modulation (e.g., GMSK, 2-GMSK, 4-GMSK, 8-PSK, MSK, FSK, ASK, QPSK, QAM, BPSK, etc.) for a given frequency band (e.g., 800/850 MHz), the second inbound HF signal 100 may be of any data modulation for a second frequency band (e.g., 1900 MHz), the third inbound HF signal 102 may be of any data modulation for a third frequency band (e.g., 2100 MHz), the fourth inbound HF signal 104 may be of any data modulation for a fourth frequency band (e.g., 900 MHz), and the fifth inbound HF signal 106 may be any data modulation for a fifth frequency band (e.g., 1800 MHz).

When the antenna structure 26 receives the first inbound HF signal 98, it provides the signal 98 to the duplexer 74, which may include a narrow band receive SAW (Surface Acoustic Wave) filter and a narrow band transmit SAW filter. Each of the receive and transmit SAW filters may be one or more of the filters shown in FIGS. 6b, 6c, and 10-13. In an embodiment, regardless of the communication protocol formatting of the inbound HF signal 98, the off-chip multiple protocol duplexer 74 filters it to produce a filtered inbound HF signal 108. For example, the duplexer 74 will filter an inbound GSM formatted signal in the same manner that it filters an inbound WCDMA formatted signal.

The receiver section 110 receives the filtered inbound HF signal 108 and converts it into a first down converted inbound signal 112 in accordance with the one of the multiple communication protocols. In an embodiment, the receiver section 110 is operable in a receive portion of a first frequency band to support multiple communication protocols. As an example, if the first frequency band corresponds to 850 MHz, then inbound HF signal 98 may be formatted in accordance with GSM 800/850 or WCDMA Band V. In this example, the receiver section 110 receives the filtered inbound HF signal 108 within the corresponding receive band of the first frequency band (e.g., 869-894 MHz down-link (DL) of GSM 800/850 and of WCDMA Band V) and converts it into the down converted signal 112. The down converted signal 112 may be at baseband or near baseband (e.g., has a carrier frequency of up to a few MHz).

When the antenna structure 26 receives the second inbound HF signal 100, it provides the signal 100 to the second duplexer 76. The second duplexer 186, which may include a narrow band receive SAW (Surface Acoustic Wave) filter centered on the receive portion of the second frequency band and a narrow band transmit SAW filter centered on the transmit portion of the second frequency band, filters the second inbound HF signal 100 to produce a second filtered inbound HF signal 114. Each of the receive and transmit SAW filters may be one or more of the filters shown in FIGS. 6b, 6c, and 10-13.

The off-chip multiple protocol duplexer 76 filters the second inbound HF signal 100 in the same manner regardless of the signal's 100 format. For example, the duplexer 76 will filter an inbound GSM formatted signal in the same manner that it filters an inbound WCDMA formatted signal.

The receiver section 110, which is operable in a receive portion of the second frequency band and supports the second plurality of communication protocols, converts the second filtered inbound signal 114 into a second down converted inbound signal 116 in accordance with the second plurality of communication protocols. As an example, if the second frequency band corresponds to 1900 MHz, then the second inbound HF signal 100 may be formatted in accordance with GSM 1900 (which may include EDGE and GPRS) or WCDMA Band II (which may include HSPA). In this example, the receiver section 110 receives the second filtered inbound HF signal 114 within the corresponding receive band of the second frequency band (e.g., 1930-1990 MHz DL of GSM 1900 or WCDMA Band II) and converts it into the second down converted signal 116. The second down converted signal 116 may be at baseband or near baseband (e.g., has a carrier frequency of up to a few MHz).

When the antenna structure 26 receives the third inbound HF signal 102, it provides the signal 102 to the third duplexer 78, which may include a narrow band receive SAW (Surface Acoustic Wave) filter centered on the receive portion of the third frequency band (e.g., 2100 MHz) and a narrow band transmit SAW filter centered on the transmit portion of the second frequency band. Each of the receive and transmit SAW filters may be one or more of the filters shown in FIGS. 6b, 6c, and 10-13.

The third duplexer 78 filters the third inbound HF signal 102 to produce a third filtered inbound HF signal 118. The third off-chip multiple protocol duplexer 78 filters the third inbound HF signal 240 in the same manner regardless of the signal's 240 format.

The receiver section 110, which is operable in a receive portion of the third frequency band and supports the third plurality of communication protocols, converts the third filtered inbound signal 118 into a third down converted inbound signal 120 in accordance with the third plurality of communication protocols. As an example, if the third frequency band corresponds to 2100 MHz, then the third inbound HF signal 102 may be formatted in accordance with WCDMA BAND-III or WCDMA Band I. In this example, the receiver section 110 receives the third filtered inbound HF signal 118 within the corresponding receive band of the third frequency band (e.g., 2110-2170 MHz DL of WCDMA Band I) and converts it into the third down converted signal 120. The third down converted signal 120 may be at baseband or near baseband (e.g., has a carrier frequency of up to a few MHz).

When the antenna structure 26 receives the fourth inbound HF signal 104, it provides the signal 104 to the first SAW filter 80, which may include a narrow band SAW (Surface Acoustic Wave) filter centered on the receive portion of the fourth frequency band (e.g., 1800 MHz). Each of the receive and transmit SAW filters may be one or more of the filters shown in FIGS. 6b, 6c, and 10-13. The first SAW filter 80 filters the fourth inbound HF signal 104 to produce a fourth filtered inbound HF signal 122.

The receiver section 110, which is operable in a receive portion of the fourth frequency band and supports the fourth plurality of communication protocols, converts the fourth filtered inbound signal 122 into a fourth down converted inbound signal 124 in accordance with the fourth plurality of communication protocols. As an example, if the fourth frequency band corresponds to 1800 MHz, then the fourth inbound HF signal 104 may be formatted in accordance with GSM 1800, GPRS 1800, or EDGE 1800. In this example, the receiver section 110 receives the fourth filtered inbound HF signal 122 within the corresponding receive band of the fourth frequency band (e.g., 1805-1880 MHz DL of GSM 1800, GPRS 1800, EDGE 1800) and converts it into the fourth down converted signal 124. The fourth down converted signal 124 may be at baseband or near baseband (e.g., has a carrier frequency of up to a few MHz).

When the antenna structure 26 receives the fifth inbound HF signal 106, it provides the signal 106 to the second SAW filter 82, which may include a narrow band SAW (Surface Acoustic Wave) filter centered on the receive portion of the fifth frequency band (e.g., 900 MHz). Each of the receive and transmit SAW filters may be one or more of the filters shown in FIGS. 6b, 6c, and 10-13. The second SAW filter 82 filters the fifth inbound HF signal 106 to produce a fifth filtered inbound HF signal 126.

The receiver section 110, which is operable in a receive portion of the fifth frequency band and supports the fifth plurality of communication protocols, converts the fifth filtered inbound signal 126 into a fifth down converted inbound signal 128 in accordance with the fifth plurality of communication protocols. As an example, if the fifth frequency band corresponds to 900 MHz, then the fifth inbound HF signal 106 may be formatted in accordance with GSM 900, GPRS 900, or EDGE 900. In this example, the receiver section 110 receives the fifth filtered inbound HF signal 126 within the corresponding receive band of the fifth frequency band (e.g., 935-960 MHz DL of GSM 900, GPRS 900, EDGE 900) and converts it into the fifth down converted signal 128. The fifth down converted signal 128 may be at baseband or near baseband (e.g., has a carrier frequency of up to a few MHz).

The transmitter section 110 converts the first outbound signal 130 into the first up converted signal 132 when the first one of the multiple communication protocols (e.g., GSM 800/850, GSM 900) is active and converts the first outbound signal 130 into the second up converted signal 134 when the second one of the multiple communication protocols is active (e.g., WCDMA band V). When the first communication protocol is active, the transmitter section 136 provides the first up converted signal 132 as the outbound HF signal 138 to the antenna structure 26 via the power amplifier (PA) 86. When the second communication protocol is active, the transmitter section 136 provides the second up converted signal 134 to the multiple protocol off-chip duplexer 74 via a PA 84.

The duplexer 74 filters the second up converted signal 134 and provides the filtered up converted signal to the antenna structure 26 as the outbound HF signal 138. The antenna structure 26 transmits the outbound HF signal 138 in a transmit portion of the first frequency band (e.g., 824-849 MHz up-link (UL) and of WCDMA Band V).

The transmitter section 136 also converts the second outbound signal 140 into the third up converted signal 142 when the first one of the second multiple communication protocols (e.g., GSM 1800, GSM 1900, WCDMA BAND-III) is active and converts the second outbound signal 140 into the fourth up converted signal 144 when the second one of the second multiple communication protocols is active (e.g., WCDMA band II). When the first one of the second multiple of communication protocols is active, the transmitter section 136 provides the third up converted signal 142 as the second outbound HF signal 146 to the antenna structure 26 via the off-chip power amplifier (PA) 90. When the second one of the second multiple of communication protocols is active, the transmitter section 136 provides the fourth up converted signal 144 to the second multiple protocol off-chip duplexer 76 via a PA 88.

The duplexer 76 filters the fourth up converted signal 144 and provides the filtered up converted signal to the antenna structure 26 as the second outbound HF signal 146. The antenna structure 26 transmits the second outbound HF signal 146 in a transmit portion of the second frequency band (e.g., 1850-1910 MHz UL of GSM 1900 or of WCDMA Band II).

The transmitter section 136 also converts a third outbound signal 148 into a fifth up converted signal (not shown) when a first one of a third multiple communication protocols (e.g., WCDMA BAND-III) is active and converts the third outbound signal 148 into a sixth up converted signal 150 when the second one of the third multiple communication protocols is active (e.g., WCDMA band I). When the first one of the second multiple of communication protocols is active, the transmitter section 136 provides the fifth up converted signal as a third outbound HF signal 152 to the antenna structure 26 via an off-chip power amplifier (PA) (not shown). When the second one of the second multiple of communication protocols is active, the transmitter section 136 provides the sixth up converted signal 150 to the third multiple protocol off-chip duplexer 78 via a PA 92.

The duplexer 78 filters the sixth up converted signal 150 and provides the filtered up converted signal to the antenna structure 26 as the third outbound HF signal 152. The antenna structure 26 transmits the third outbound HF signal 152 in a transmit portion of the third frequency band (e.g., 1920-1980 MHz UL, 2110-2170 MHz DL of WCDMA BAND-III or of WCDMA Band I). Note that the SAW filters of the duplexers, the SAW filters, the receiver section, and/or the transmitter section may include one or more filters (e.g., low pass, band pass, high pass filters) as described with reference to one or more of FIGS. 6b, 6c, and 10-13.

Figure 3:
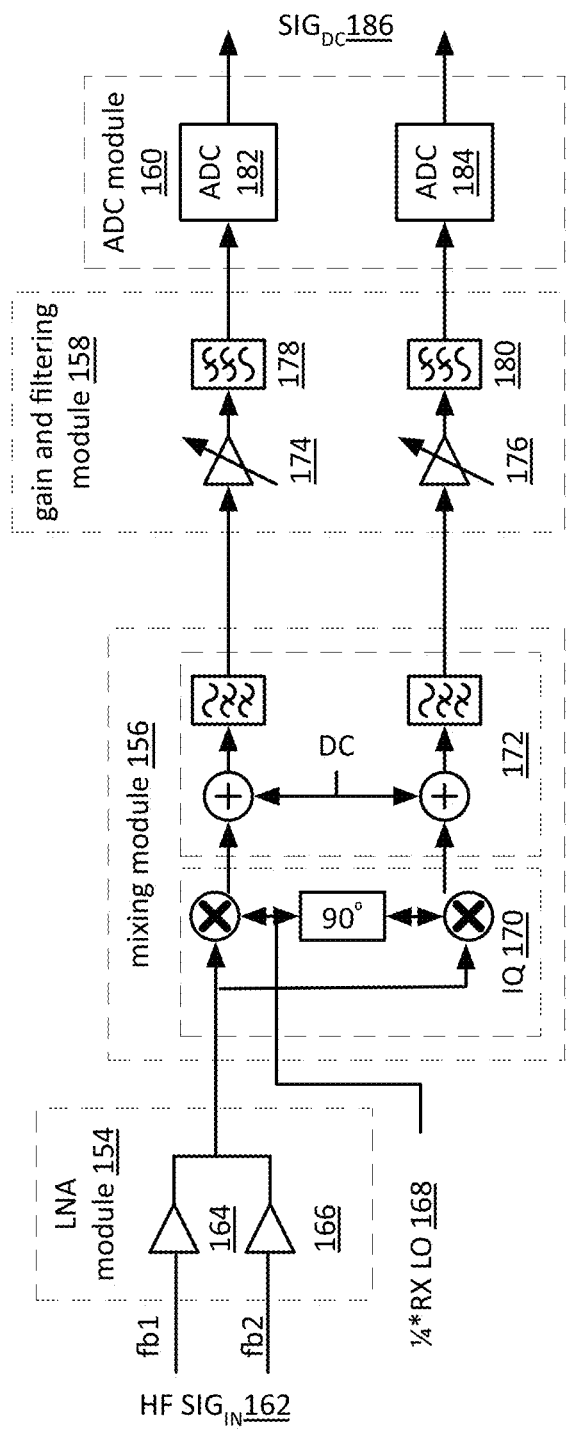
FIG. 3 is a schematic block diagram of an embodiment of a receiver section in accordance with the present invention.

FIG. 3 is a schematic block diagram of an embodiment of a receiver module that includes a low noise amplifier module 154, a mixing module 156, an analog gain and digital filtering module 158, and an analog to digital converter module 160. The low noise amplifier (LNA) module 154 is coupled to amplify the inbound high frequency signal 162 to produce an amplified inbound high frequency signal. In an embodiment, the LNA module 154 includes a first LNA 164 and a second LNA 166. The first low noise amplifier 164 amplifies the inbound high frequency signal 162 to produce the amplified inbound high frequency signal when the inbound high frequency signal has the carrier frequency within a first frequency band of the first set of frequency bands (e.g., fb1=one of 800 or 900 MHz). The second low noise amplifier 166 amplifies the inbound high frequency signal 162 to produce the amplified inbound high frequency signal when the inbound high frequency signal has the carrier frequency within a second frequency band of the first set of frequency bands (e.g., fb2=the other of 800 or 900 MHz).

The mixing module 156 mixes the amplified inbound high frequency signal with the receive local oscillation 168 (e.g., 800 MHz or 900 MHz frequency band) to produce a low frequency mixed signal. In an embodiment, the mixing module 156 includes an in-phase/quadrature (I/Q) mixer 170 and a filtering stage 172. The I/Q mixer 170 mixes the amplified inbound high frequency signal with an I component of the receive local oscillation 168 and with a Q component of the receive local oscillation 168 to produce an IQ mixed signal. The filtering stage 172, which may include a DC adjust circuit and a low pass filter, filters the IQ mixed signal to produce the low frequency mixed signal.

The analog gain and filtering module 158, which may include an adjustable gain stage 174, 176 and a low pass filter 178,180 for the I component and the Q component of the IQ mixed signal, performs at least one of filtering and gain adjusting of the low frequency mixed signal to produce an adjusted low frequency mixed signal. The analog to digital conversion module 160, which may include a pair of analog to digital converters 182, 184, converts the adjusted low frequency mixed signal into the down converted inbound signal 186. Note that the filters in the mixing module 156 and/or in the gain and filtering module may be band pass filters in accordance with an embodiment of a filter as further described with reference to one or more of FIGS. 6b, 6c, and 10-13.

Figure 4:
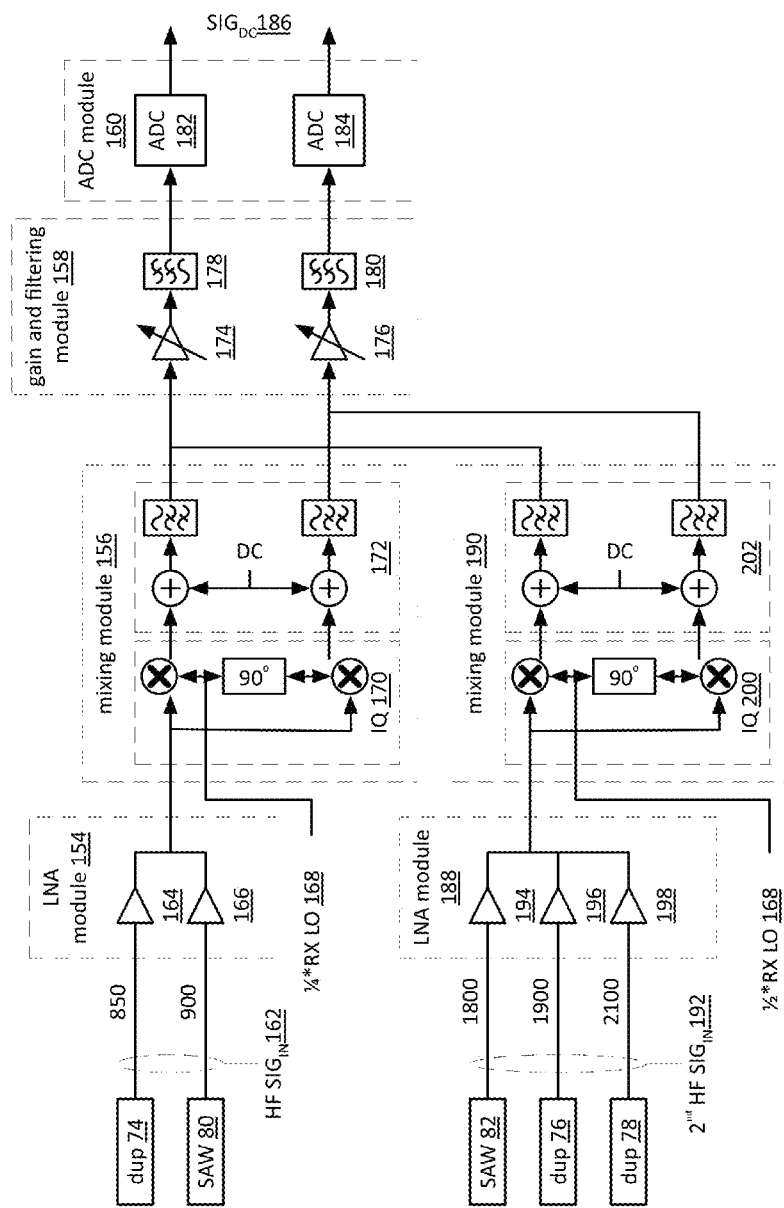
FIG. 4 is a schematic block diagram of another embodiment of a receiver section in accordance with the present invention.

FIG. 4 is a schematic block diagram of another embodiment of the receiver module that includes the first low noise amplifier module 154, a second low noise amplifier module 188, the first mixing module 156, a second mixing module 190, the analog gain and digital filtering module 158, and the analog to digital converter module 160. The first LNA module 154 and the first mixing module 156 operate as previously discussed with reference to FIG. 3.

The second low noise amplifier (LNA) module 188 is coupled to amplify the second inbound high frequency signal 192 to produce a second amplified inbound high frequency signal. The second inbound HF signal 192 may be formatted in accordance with any one of a second plurality of wireless communication protocols. For example, the first plurality of wireless communication protocols may include protocols that use an 800 MHz frequency band and/or a 900 MHz frequency band such as GSM 800/850, GSM 900, WCDMA Band V, EDGE at 800 or 900 MHz, GPRS at 800 or 900 MHz, and HSPA in Band V. The second plurality of wireless communication protocols may include protocols that use an 1800 MHz frequency band, a 1900 MHz frequency band, and/or a 2100 MHz frequency band such as GSM 1800, GSM 1900, WCDMA Band II, WCDMA Band I, HSPA at 1900 or 2100 MHz, GPRS at 1800 or 1900 MHz, and EDGE at 1800 or 1900 MHz.

In an embodiment, the second LNA module 188 includes a first LNA 194, a second LNA 196, and a third LNA 198. The first low noise amplifier 194 amplifies the second inbound high frequency signal 192 to produce the second amplified inbound high frequency signal when the second inbound high frequency signal has the carrier frequency within a first frequency band of the second set of frequency bands (e.g., 1800 of 1800, 1900, and 2100 MHz). The second low noise amplifier 196 amplifies the second inbound high frequency signal 192 to produce the second amplified inbound high frequency signal when the inbound high frequency signal has the carrier frequency within a second frequency band of the second set of frequency bands (e.g., 1900 of 1800, 1900, and 2100 MHz). The third low noise amplifier 198 amplifies the second inbound high frequency signal 192 to produce the second amplified inbound high frequency signal when the inbound high frequency signal has the carrier frequency within a second frequency band of the second set of frequency bands (e.g., 2100 of 1800, 1900, and 2100 MHz).

The second mixing module 190 mixes the second amplified inbound high frequency signal with the receive local oscillation 168 (e.g., corresponding to the 1800, 1900, or 2100 MHz frequency band) to produce a second low frequency mixed signal. In an embodiment, the second mixing module 190 includes an in-phase/quadrature (I/Q) mixer 200 and a filtering stage 202. The I/Q mixer 200 mixes the second amplified inbound high frequency signal with an I component of the receive local oscillation 192 and with a Q component of the receive local oscillation 192 to produce a second IQ mixed signal. The filtering stage 202, which may include a DC adjust circuit and/or a low pass filter, filters the second IQ mixed signal to produce a second low frequency mixed signal.

The analog gain and filtering module 158, which may include an adjustable gain stage 174,176 and a low pass filter 178, 180 for the I component and the Q component of the IQ mixed signal, performs at least one of filtering and gain adjusting of the low frequency mixed signal or the second low frequency mixed signal to produce an adjusted low frequency mixed signal. The analog to digital conversion module 160, which may include a pair of analog to digital converters 182, 184, converts the adjusted low frequency mixed signal into the down converted inbound signal 262.

As an example, let the first inbound HF signal 186 be expressed as $A_1(t)*\cos(\omega_{HF1}(t)+\omega_{D1}(t)+\theta_1(t))$ and let the second inbound HF signal 192 be expressed as $A_2(t)*\cos(\omega_2(t)+\omega_{D2}(t)+\theta_2(t))$, where $A_1(t)$ represents amplitude information of the first inbound HF signal 162, $\omega_{HF1}(t)$ represents the carrier frequency of the first inbound HF signal 258, $\omega_{D1}(t)$ represents the data frequency of the first inbound HF signal 162, and $\theta_1(t)$ represents phase information of the first inbound HF signal 162; and where $A_2(t)$ represents amplitude information of the second inbound HF signal 192, $\omega_{HF2}(t)$ represents the carrier frequency of the second inbound HF signal 326, $\omega_{D2}(t)$ represents the data frequency of the second inbound HF signal 192 and $\theta_2(t)$ represents phase information of the second inbound HF signal 192. Further, let the receive local oscillation 168 be expressed as $\cos(\omega_{RX}(t))$, where $\omega_{RX}(t)$ represents the frequency of the local oscillation 168.

When the first inbound HF signal 162 is being received, the local oscillation 168 is adjusted such that $\omega_{RX}(t)$ substantially equals $\omega_{HF1}(t)$. In this instance, the first mixing module 156 mixes the first inbound HF signal 162 [e.g., $A_1(t)*\cos(\omega_{HF1}(t)+\omega_{D1}(t)+\theta_1(t))$] with ¼ times the local oscillation [e.g., $\cos(\omega_{RX}(t))$] 260 to produce the down converted mixed signal, which, for the I path, may be expressed as $A_1(t)*\cos(\omega_{D1}(t)+\theta_1(t))$.

When the second inbound HF signal 192 is being received, the local oscillation 168 is adjusted such that $\omega_{RX}(t)$ substantially equals $\omega_{HF2}(t)$. In this instance, the second mixing module 190 mixes the second inbound HF signal 192 [e.g., $A_2(t)*\cos(\omega_{HF2}(t)+\omega_{D2}(t)+\theta_2(t))$] with ½ times the local oscillation [e.g., $\cos(\omega_{RX}(t))$] 168 to produce the down converted mixed signal, which, for the I path, may be expressed as $A_2(t)*\cos(\omega_{D2}(t)+\theta_2(t))$.

As can be deduced from this example, once the first or second inbound HF signal has been mixed via the mixing modules 156 or 190, the resulting signals are of a similar format and have retained the particular amplitude information, phase information, and data frequency of the particular protocol regardless of the carrier frequency. As such, the receiver module is protocol independent and frequency band dependent (at least to a set of frequency bands). Note that the filters in the mixing module and/or in the gain and filtering module may be high pass and/or band pass filters in accordance with an embodiment of a filter as further described with reference to one or more of FIGS. 6b, 6c, and 10-13.

Figure 5:
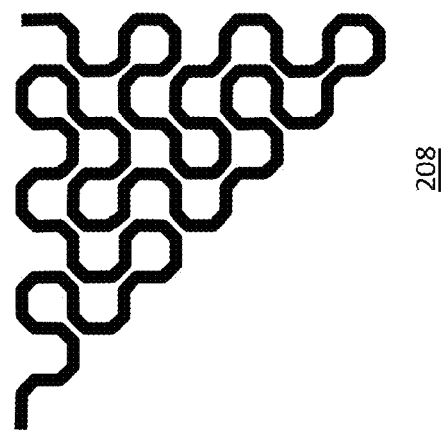
FIG. 5 is a diagram of examples of $7^{th}$ order Polya curves in accordance with the present invention.
Figure 5:
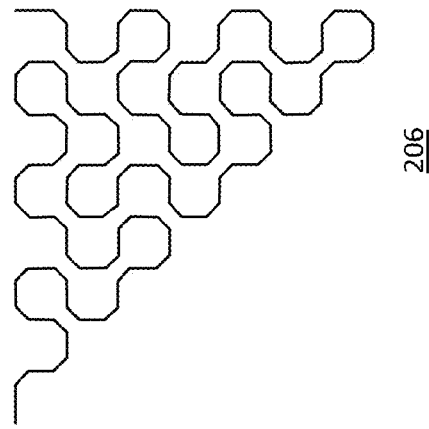
Figure 5:
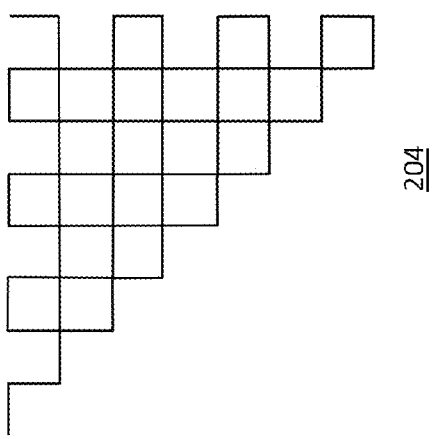

FIG. 5 is a diagram of examples of $7^{th}$ order Polya curves. The first curve 204 is a $7^{th}$ order Polya curve having a first shaping factor (e.g., 0.10), a first line width, and a first rotational angle (e.g., 90 degrees). The second curve 206 is a $7^{th}$ order modified Polya curve having a second shaping factor (e.g., 0.25), a second line width, and a second rotational angle (e.g., 90 degrees). The third curve 208 is a $7^{th}$ order modified Polya curve having a third shaping factor (e.g., 0.25), a third line width, and a third rotational angle (e.g., 90 degrees). Each of the curves may have different rotational angle, different line widths, and/or different shaping factors. Further, each of the curves may be confined within a geometric shape (e.g., a triangle (right angle, obtuse angle, equilateral, isosceles, or scalene), a square, a rectangle, etc.).

Figures 6A, 6B, 6C:
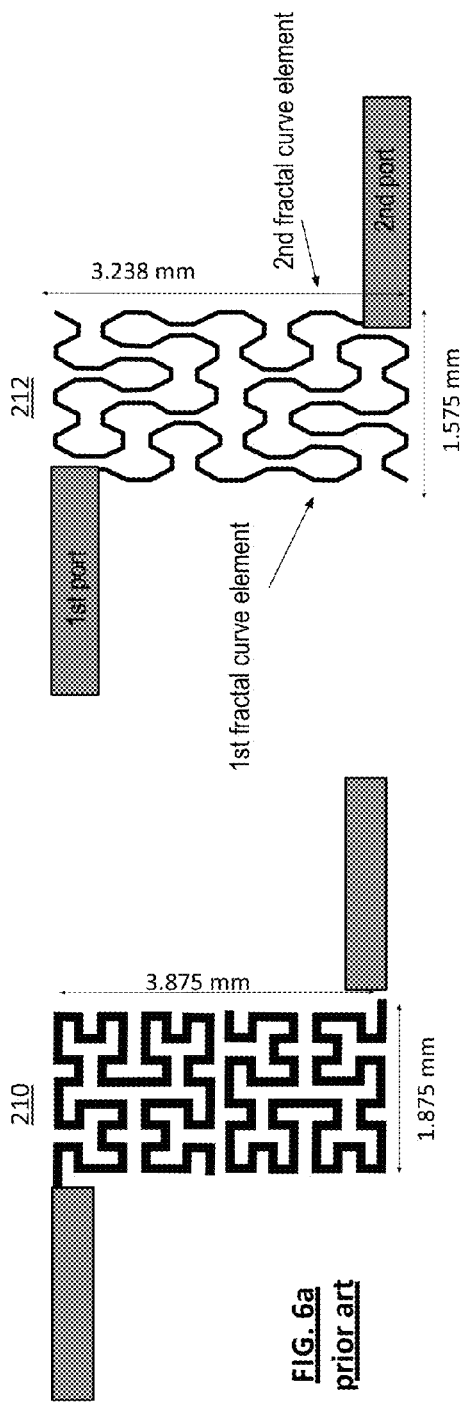
FIG. 6a is a diagram of an example of a prior art filter and examples of filters in accordance with the present invention.
FIGS. 6b and 6c are diagrams of examples of filters in accordance with the present invention.

FIG. 6a is a diagram of an example of a prior art 5.5 GHz band pass filter (BPF) 210 having a Hilbert shape. The prior art filter 210 yields a 64% footprint reduction from a traditional microstrip filter. For instance, a Hilbert shaped BPF may have a footprint of 3.875 mm by 1.875 mm.

FIG. 6b is a diagram of an example of a 5.5 GHz band pass filter 212 having a first port, a second port, a first fractal curve based filter element coupled to the first port, and a second fractal curve (e.g., modified Polya curve) based filter element coupled to the second port. Each of the first and second fractal curve based filter elements may have a modified Polya curve pattern and confined in a right angle triangle geometric shape. In addition, the ports and the fractal curve based filter elements are one the same surface of a substrate.

Each of the first and second fractal curve based filter element have electromagnetic properties (e.g., an inductance-capacitance-based impedance network over the 5.5 GHz frequency range), which may be substantially similar or different. In operation, the first fractal curve based filter element is electromagnetically coupled to the second fractal curve based filter element to filter radio frequency (RF) signals in the 5.5 GHz frequency band. In this embodiment, the filter has a length of 3.238 mm and a width of 1.575 mm, which yields a footprint that is 30% smaller than the prior art filter of FIG. 6a.

FIG. 6c is a diagram of an example of a 5.5 GHz band pass filter 214 having a first port, a second port, a first fractal curve based filter element coupled to the first port, and a second fractal curve (e.g., modified Polya curve) based filter element coupled to the second port. Each of the first and second fractal curve based filter elements may have a modified Polya curve pattern and confined in an isosceles triangle geometric shape. In addition, the ports and the fractal curve based filter elements are one the same surface of a substrate.

Each of the first and second fractal curve based filter element have electromagnetic properties (e.g., an inductance-capacitance-based impedance network over the 5.5 GHz frequency range), which may be substantially similar or different. In operation, the first fractal curve based filter element is electromagnetically coupled to the second fractal curve based filter element to filter radio frequency (RF) signals in the 5.5 GHz frequency band. In this embodiment, the filter has a first dimension of 2.610 mm and a second dimension of 1.966 mm, which yields a footprint that is 33% smaller than the prior art filter of FIG. 6a.

Figure 7:
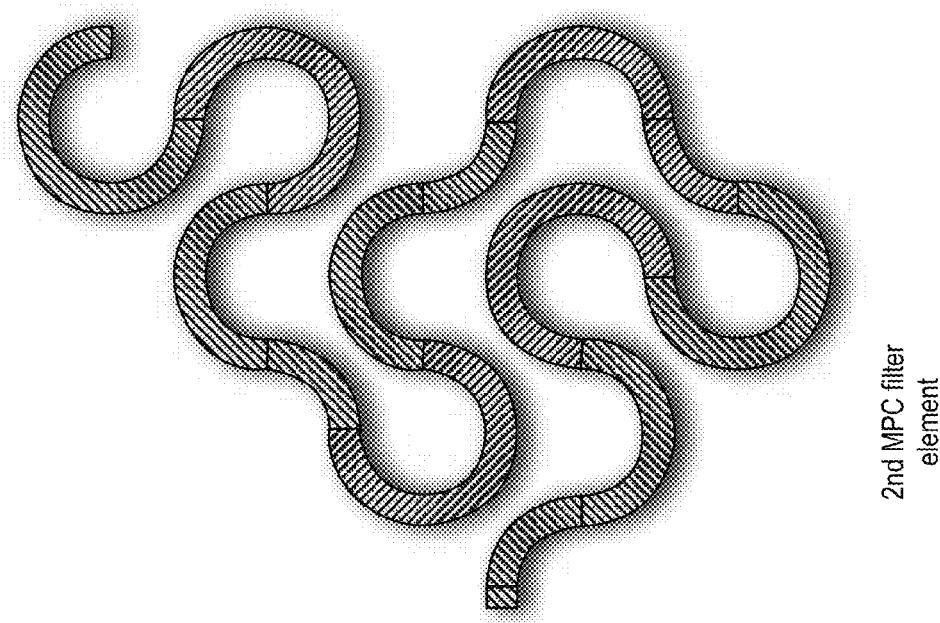
FIG. 7 is a diagram of examples of $6^{th}$ order Polya curves in accordance with the present invention.
Figure 7:
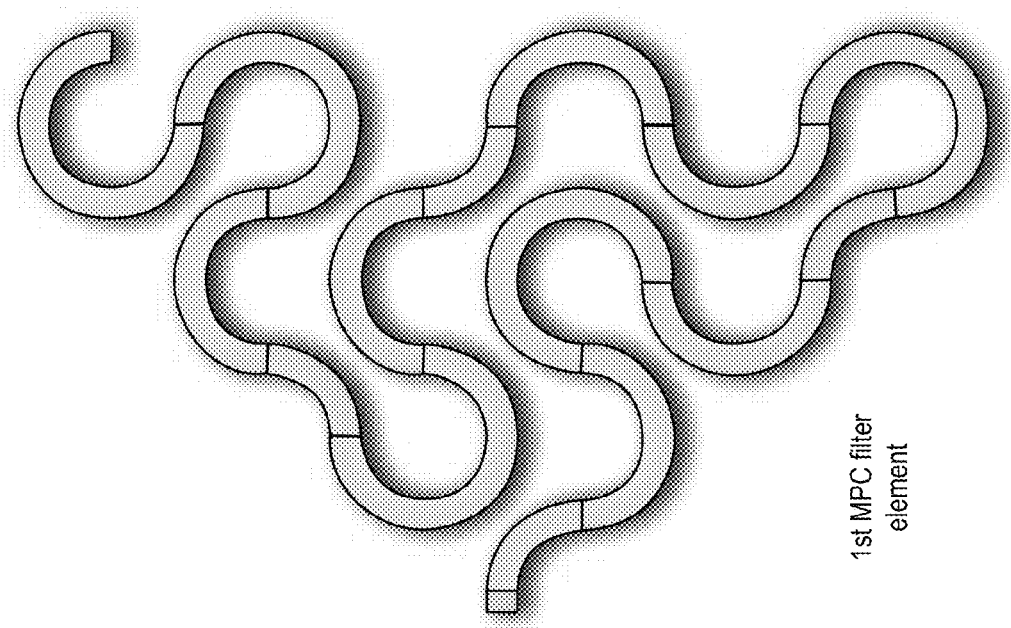

FIG. 7 is a diagram of examples of two $6^{th}$ order Polya curves that may be used as a first MPC filter element and a second MPC filter element for a filter (e.g., high pass, low pass, or band pass). Each of the $6^{th}$ order modified Polya curve (MPC) filter elements may be confined within the same, mirroring, and/or complimentary geometric shape in two-dimensional space or three-dimensional space. The filter may be used for multiple frequency band applications and may have several design variables (e.g., line weight, rotational angle, shaping factor, etc.). In addition, the filter may have 2N terminals, where N is the number of MPC (modified Polya curve) elements and may have an arbitrary initial curve with 2 open terminals.

Figure 8:
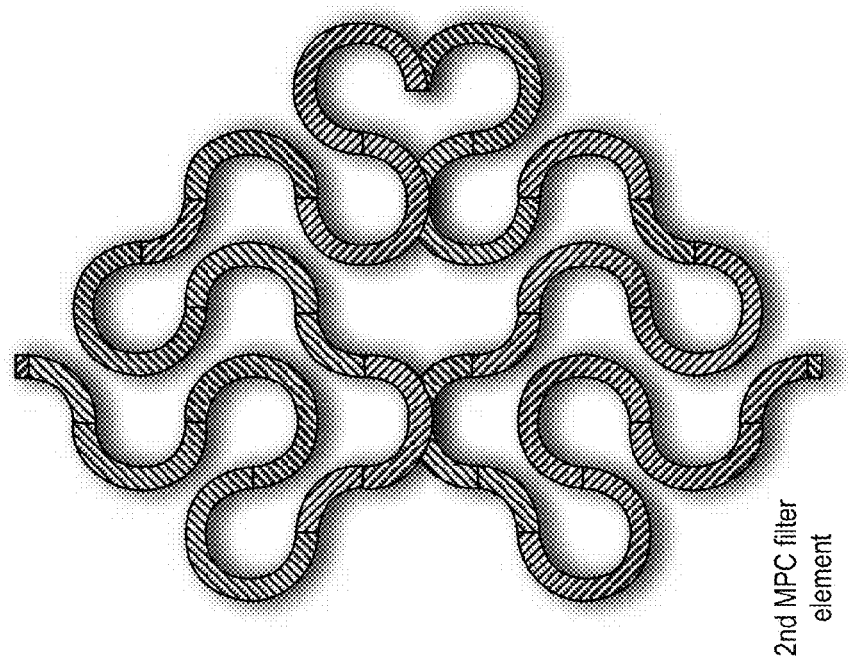
FIG. 8 is a diagram of examples of symmetrical $6^{th}$ order Polya curves in accordance with the present invention.
Figure 8:
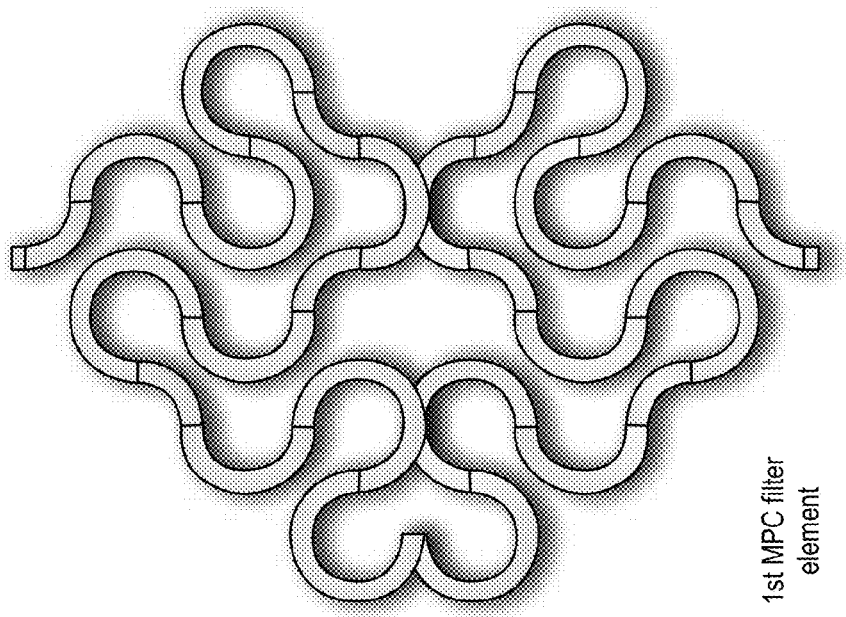

FIG. 8 is a diagram of examples of symmetrical $6^{th}$ order Polya curves that may be used for a filter (e.g., high pass, low pass, or band pass). The $6^{th}$ order modified Polya curve (MPC) may be confined within a given geometric shape in two-dimensional space or three-dimensional space. For example, the first MPC filter element has a geometric shape (e.g., a triangle (right angle, obtuse angle, equilateral, isosceles, or scalene), a square, a rectangle, etc.) and the second MPC filter element has the same (or similar), but mirroring (or corresponding), geometric shape.

The filter may be used for multiple frequency band applications and may have several design variables (e.g., line weight, rotational angle, shaping factor, etc.). In addition, the filter may have 2N terminals, where N is the number of MPC elements and may have an arbitrary initial curve with 2 open terminals.

Figure 9:
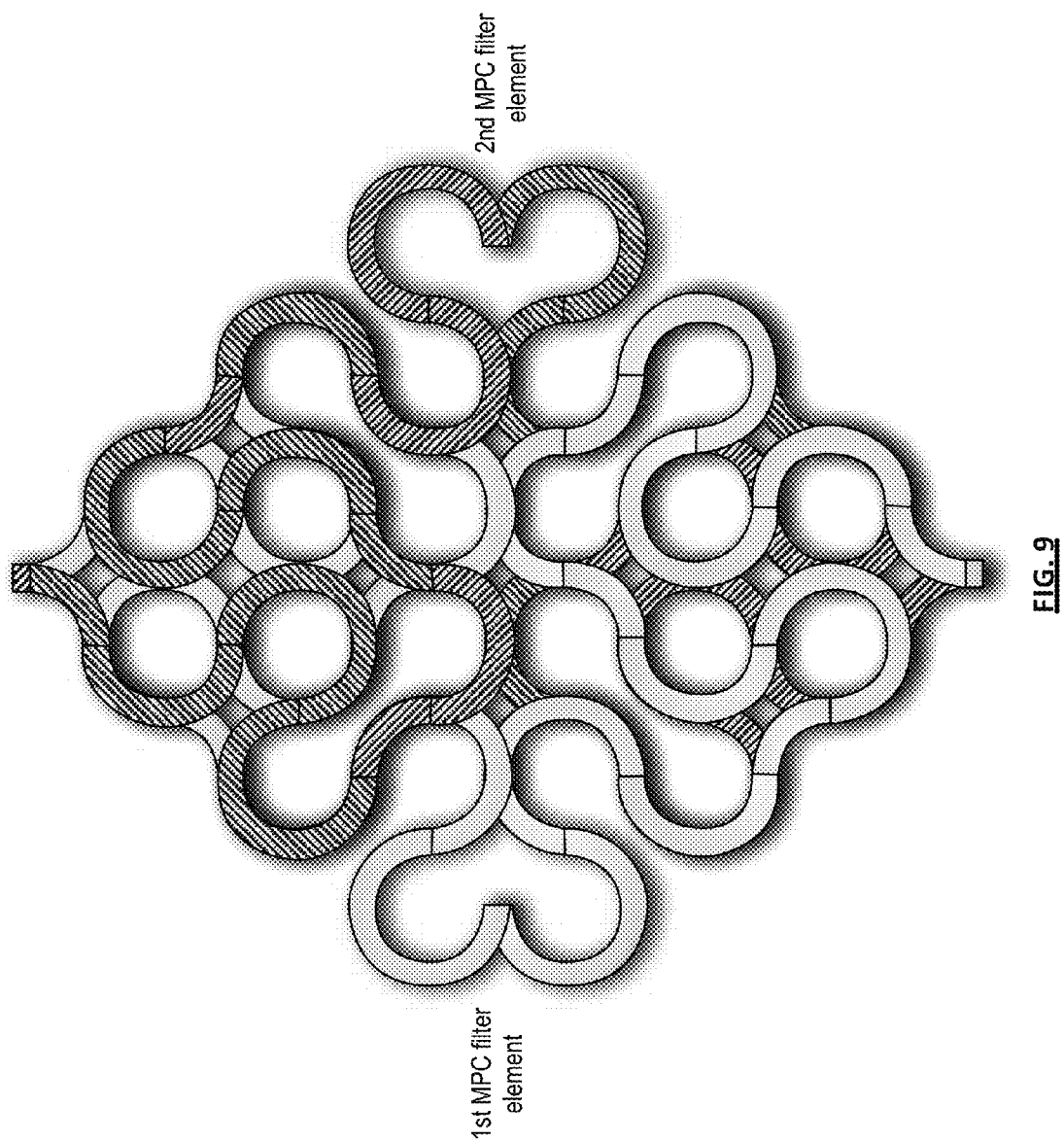
FIG. 9 is another diagram of examples of symmetrical $6^{th}$ order Polya curves in accordance with the present invention.

FIG. 9 is another diagram of examples of symmetrical $6^{th}$ order Polya curves that may be used for first and second MPC filter elements of a filter (e.g., high pass, low pass, or band pass). Each of the $6^{th}$ order modified Polya curve (MPC) filter elements may be confined within a given geometric shape in two-dimensional space or three-dimensional space. In this example, the first MPC filter element includes two sections: a first section in a first plane and the second section in a second plane. The second MPC filter element also includes two sections: a first section in the second plane and a second section in the first plane. In addition, the MPC filter elements overlap such that the first section of each filter element overlaps and the second section of each filter element overlaps.

The filter may be used for multiple band applications and may have several design variables (e.g., line weight, rotational angle, shaping factor, etc.). In addition, the filter may have 2N terminals, where N is the number of MPC elements and may have an arbitrary initial curve with 2 open terminals.

Figure 10:
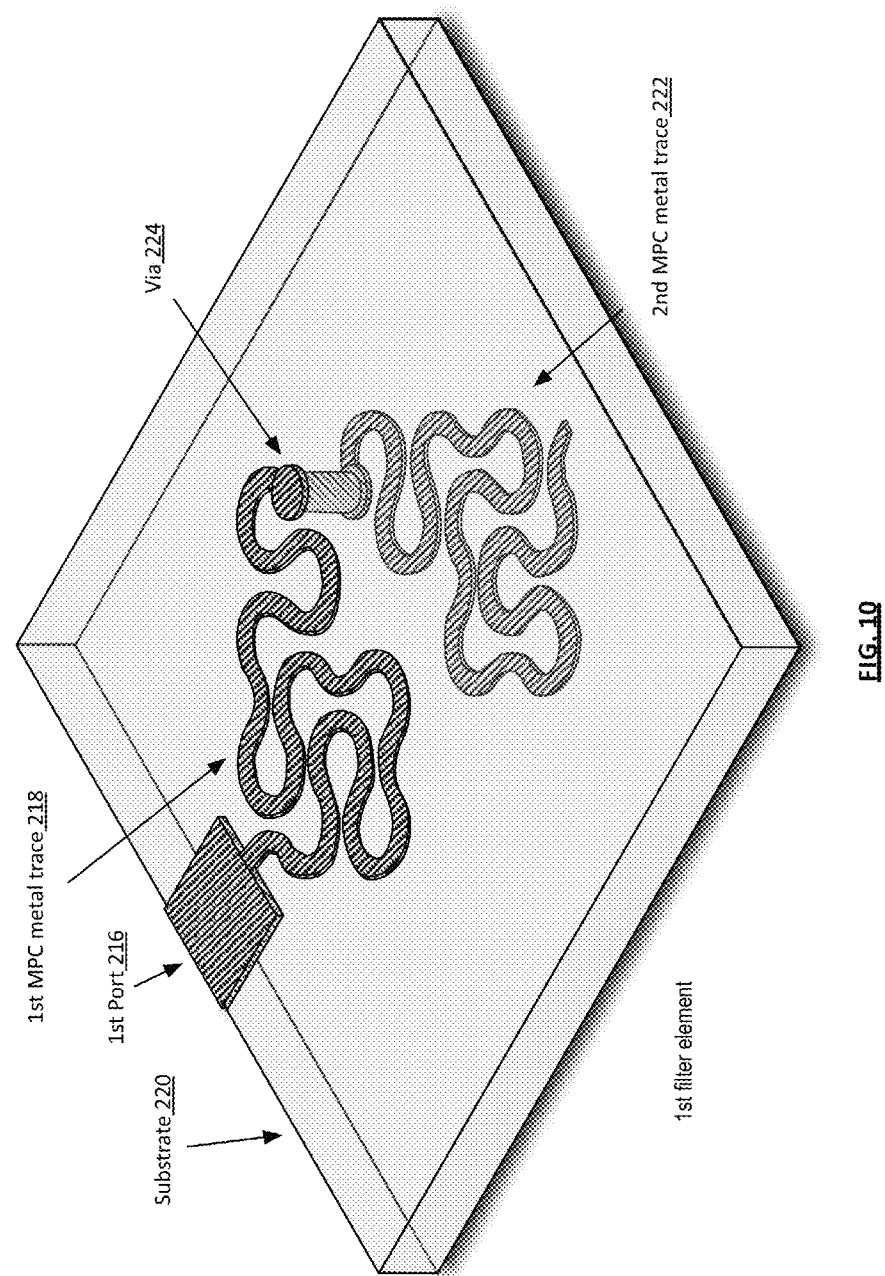
FIG. 10 is a diagram of an embodiment of a first port of a filter having a modified Polya curve shape in accordance with the present invention.

FIG. 10 is a diagram of an embodiment of a first filter element of a filter having a fractal curve shape (e.g., a modified Polya curve, iterated function systems fractal curves, etc.). The first filter element includes a first port 216, a $1^{st}$ MPC (or other fractal curve) metal trace 218, a $2^{nd}$ MPC (or other fractal curve) metal trace 222, and a via 224 on a substrate 220 (e.g., an integrated circuit (IC) die, an IC package substrate, a printed circuit board, etc.). The first port 216 is represented by the substantially square metal trace that is coupled to a first MPC metal trace 218, which are both on one side of a substrate 220. A second MPC metal trace 222 is on a second side of the substrate 220. The first and second MPC metal traces are coupled together by one or more electrically conductive vias 224. Each of the first and second MPC metal traces 218 and 222 of the first filter element are confined within a geometric shape (e.g., an isosceles triangle or other shape).

Figure 11:
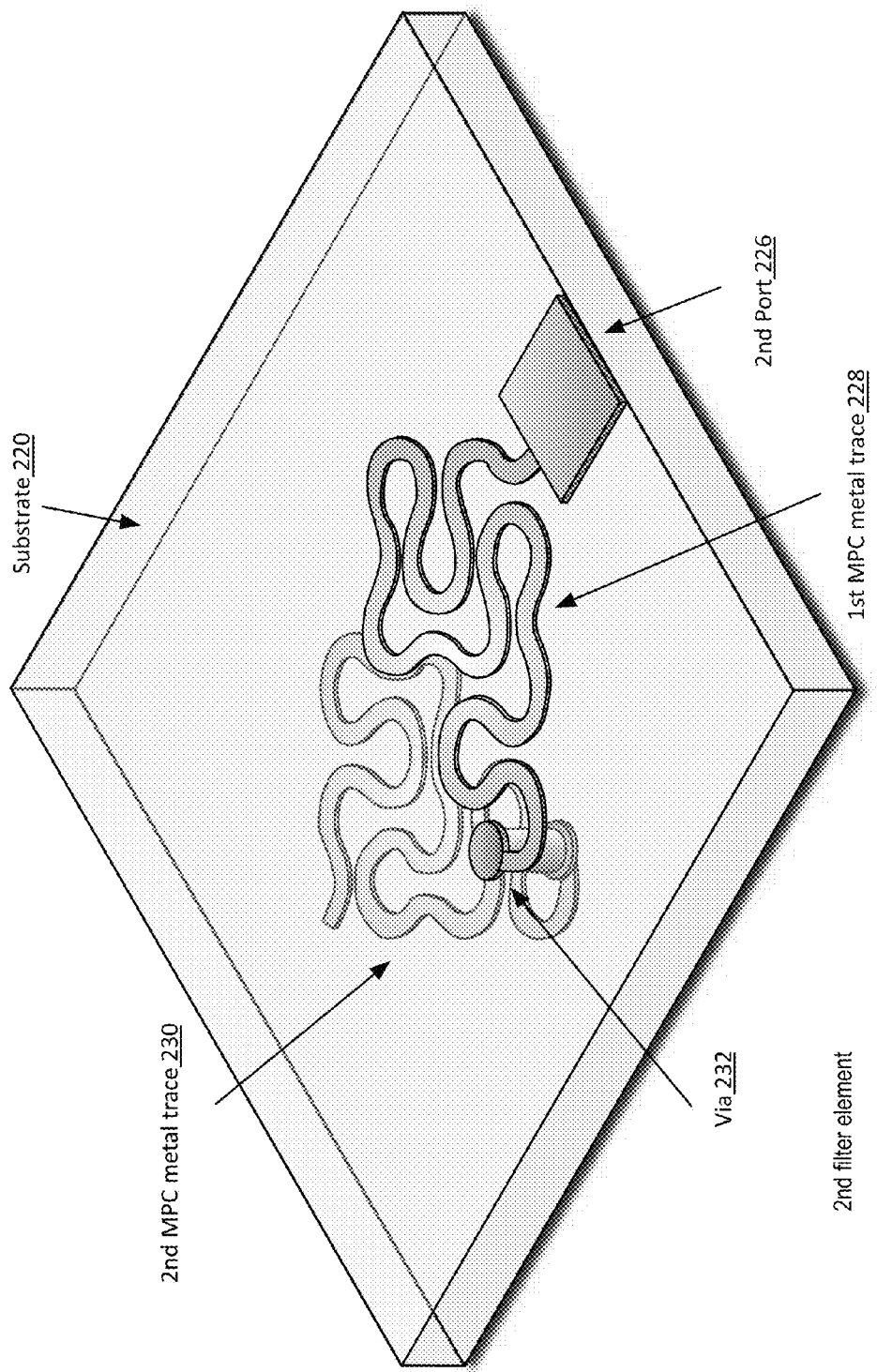
FIG. 11 is a diagram of an embodiment of a second port of a filter having a modified Polya curve shape in accordance with the present invention.

FIG. 11 is a diagram of an embodiment of a second filter element of a filter having a fractal curve shape (e.g., a modified Polya curve, iterated function systems fractal curves, etc.). The second filter element includes a second port 226, a first MPC (or other fractal curve) metal trace 228, a second MPC (or other fractal curve) metal trace 230, and a via 232 on the substrate 220. The second port 226 is represented by the substantially square metal trace that is coupled to a first MPC metal trace 228, which are both on one side of a substrate 220. A second MPC metal trace 230 is on a second side of the substrate 220. The first and second MPC metal traces are coupled together by one or more electrically conductive vias 232. Each of the first and second MPC metal traces 228 and 230 of the second filter element are confined within a geometric shape (e.g., an isosceles triangle or other shape). Note that the geometric shape of the second filter element mirrors (or is complementary) to the geometric shape of the first filter element.

Figure 12:
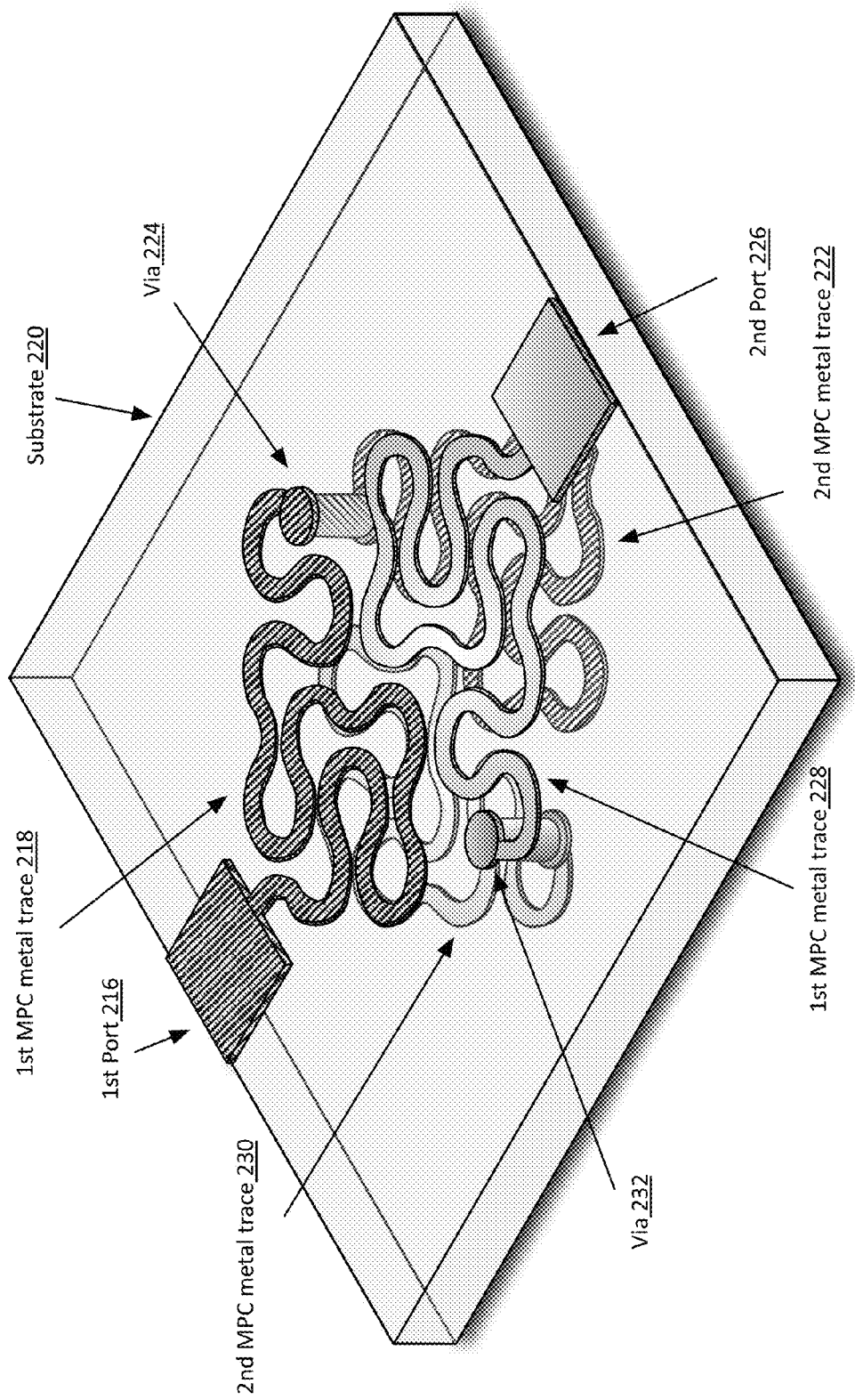
FIG. 12 is a diagram of an embodiment of a filter having a modified Polya curve shape in accordance with the present invention.

FIG. 12 is a diagram of an embodiment of a filter having a modified Polya curve shape that includes a first port 216, a second port 226, a first fractal curve based filter element, and a second fractal curve based filter element. The first port 216 is coupled to the first metal trace 218 of the first fractal curve based filter element and the second port 226 is coupled to the first metal trace 228 of the second fractal curve based filter element.

Each of the first and second fractal curved based filter elements may include one or more segments. For example, the first fractal curve based filter element includes a first MPC (or other fractal curve shape) metal trace 218 and a second MPC (or other fractal curve shape) metal trace 222 coupled together by a via 224. The second fractal curve based filter element includes a first MPC (or other fractal curve shape) metal trace 228 and a second MPC (or other fractal curve shape) metal trace 230 coupled together by a via 232. The first metal traces 218 and 228 of the first and second filter elements are on opposite sides of the substrate (or different layers of a multiple layer substrate). The second metal traces 222 and 230 of the first and second filter elements are also on opposite sides of the substrate (or on the different layers of the multiple layer substrate), where the second metal trace 230 of the second filter element minors the first metal trace 218 of the first filter element and the second metal trace 222 of the first filter element minors the first metal element 228 of the second filter element. In addition, each of the metal traces 218, 222, 228, and 230 are confined within a geometric shape (e.g., an isosceles triangle).

When an RF or MMW signal is applied to one of the ports, the electromagnetic properties of the filter elements enable the first filter element to be electromagnetically coupled to the second filter element and to provide a desired filter response (e.g., band pass filter, high pass filter, low pass filter, notch filter). For instance, each of the filter elements provides an impedance network (which may be substantially similar or different) within a given frequency band (e.g., 5.5 GHz). The impedance network is based on the inductive and capacitive properties of the filter elements, which can be established based on the length, width, and pattern of the filter elements. Thus, to provide substantially similar impendence networks, the inductive and capacitive properties of the filter elements should be substantially similar. Correspondingly, if different impedance networks are desired, then the inductive and capacitive properties of the filter elements should be different.

The electromagnetic coupling between the filter elements is affected by the overlapping of the filter elements, the thickness of the substrate, the trace width of the filter elements, the pattern of the filter elements, and the dielectric properties of the substrate 220. The pattern of the filter elements may be a modified Polya curve pattern of an order (e.g., $6^{th}$), a rotation angle (e.g., 90 degrees), and shaping factor (e.g., 0.25).

Figure 13:
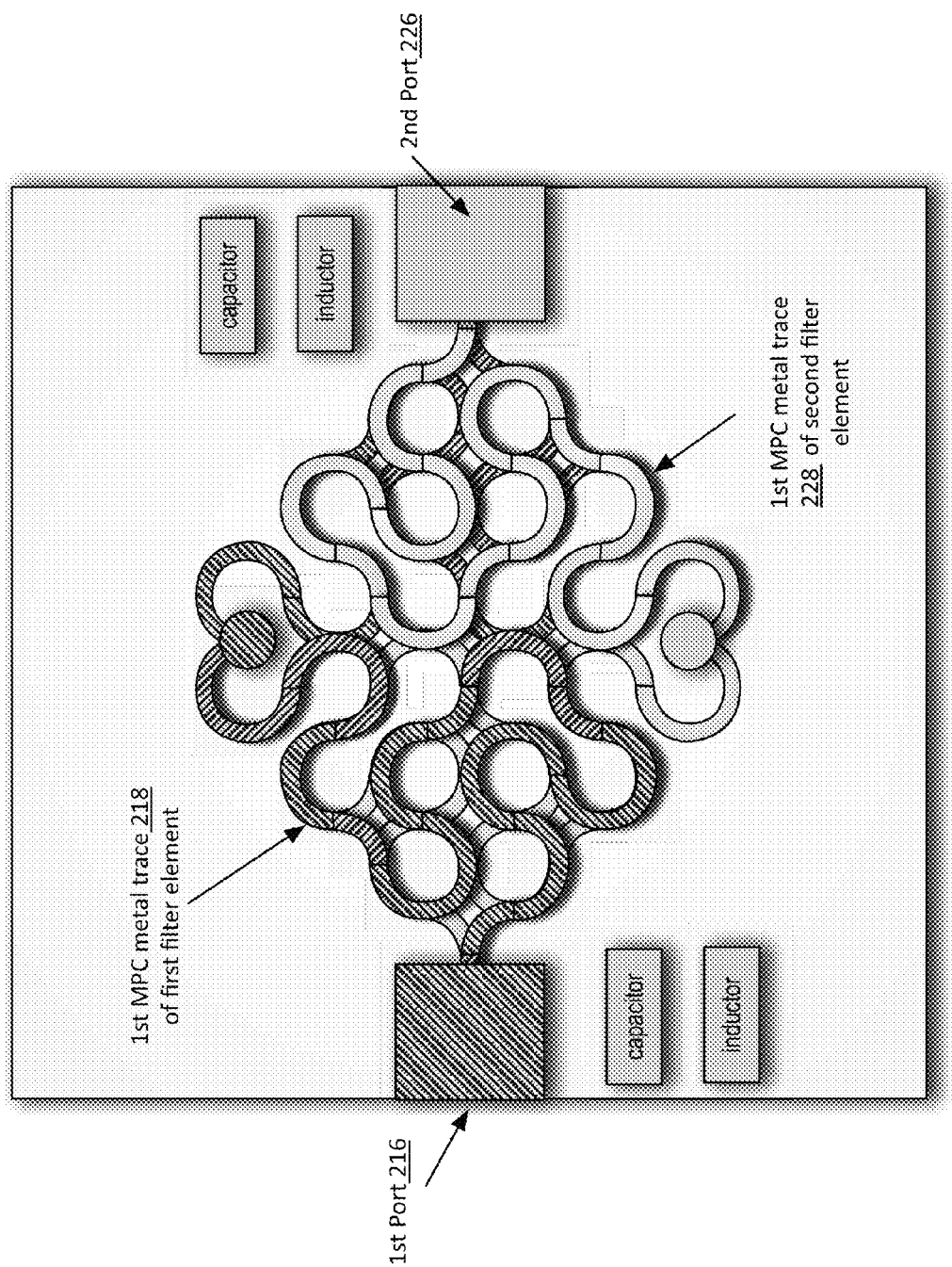
FIG. 13 is a diagram of another embodiment of a filter having a modified Polya curve shape in accordance with the present invention.

FIG. 13 is a diagram of an example of a 5.5 GHz band pass filter that includes similar filter elements as those shown in FIG. 12. In this example, the MPC traces may be confined to a diamond shape having dimensions of 1.315 mm by 1.315 mm. The line width may be 50 micrometer, the line spacing may be 50 micrometer, the via diameter may be 100 micrometer, the metal thickness may be 17 micrometer, and the substrate thickness may be 0.2 mm.

The band pass filter may further include one or more capacitors and one or more inductors, which may be used to tune the filter response of the band pass filter. For instance, a first capacitor and/or a first inductor may be coupled to the first fractal curve based filter element to tune the first electromagnetic properties and a second capacitor and/or second inductor may be coupled to the second fractal curve based filter element to tune the second electromagnetic properties.

As may be used herein, the terms "substantially" and "approximately" provides an industry-accepted tolerance for its corresponding term and/or relativity between items. Such an industry-accepted tolerance ranges from less than one percent to fifty percent and corresponds to, but is not limited to, component values, integrated circuit process variations, temperature variations, rise and fall times, and/or thermal noise. Such relativity between items ranges from a difference of a few percent to magnitude differences. As may also be used herein, the term(s) "operably coupled to", "coupled to", and/or "coupling" includes direct coupling between items and/or indirect coupling between items via an intervening item (e.g., an item includes, but is not limited to, a component, an element, a circuit, and/or a module) where, for indirect coupling, the intervening item does not modify the information of a signal but may adjust its current level, voltage level, and/or power level. As may further be used herein, inferred coupling (i.e., where one element is coupled to another element by inference) includes direct and indirect coupling between two items in the same manner as "coupled to". As may even further be used herein, the term "operable to" or "operably coupled to" indicates that an item includes one or more of power connections, input(s), output(s), etc., to perform, when activated, one or more its corresponding functions and may further include inferred coupling to one or more other items. As may still further be used herein, the term "associated with", includes direct and/or indirect coupling of separate items and/or one item being embedded within another item. As may be used herein, the term "compares favorably", indicates that a comparison between two or more items, signals, etc., provides a desired relationship. For example, when the desired relationship is that signal 1 has a greater magnitude than signal 2, a favorable comparison may be achieved when the magnitude of signal 1 is greater than that of signal 2 or when the magnitude of signal 2 is less than that of signal 1.

While the transistors in the above described figure(s) is/are shown as field effect transistors (FETs), as one of ordinary skill in the art will appreciate, the transistors may be implemented using any type of transistor structure including, but not limited to, bipolar, metal oxide semiconductor field effect transistors (MOSFET), N-well transistors, P-well transistors, enhancement mode, depletion mode, and zero voltage threshold (VT) transistors.

The present invention has also been described above with the aid of method steps illustrating the performance of specified functions and relationships thereof. The boundaries and sequence of these functional building blocks and method steps have been arbitrarily defined herein for convenience of description. Alternate boundaries and sequences can be defined so long as the specified functions and relationships are appropriately performed. Any such alternate boundaries or sequences are thus within the scope and spirit of the claimed invention.

The present invention has been described, at least in part, in terms of one or more embodiments. An embodiment of the present invention is used herein to illustrate the present invention, an aspect thereof, a feature thereof, a concept thereof, and/or an example thereof. A physical embodiment of an apparatus, an article of manufacture, a machine, and/or of a process that embodies the present invention may include one or more of the aspects, features, concepts, examples, etc. described with reference to one or more of the embodiments discussed herein.

The present invention has been described above with the aid of functional building blocks illustrating the performance of certain significant functions. The boundaries of these functional building blocks have been arbitrarily defined for convenience of description. Alternate boundaries could be defined as long as the certain significant functions are appropriately performed. Similarly, flow diagram blocks may also have been arbitrarily defined herein to illustrate certain significant functionality. To the extent used, the flow diagram block boundaries and sequence could have been defined otherwise and still perform the certain significant functionality. Such alternate definitions of both functional building blocks and flow diagram blocks and sequences are thus within the scope and spirit of the claimed invention. One of average skill in the art will also recognize that the functional building blocks, and other illustrative blocks, modules and components herein, can be implemented as illustrated or by discrete components, application specific integrated circuits, processors executing appropriate software and the like or any combination thereof.

What is claimed is:

1. A filter comprises:
a first port;
a second port;
a first fractal curve based filter element coupled to the first port; and
a second fractal curve based filter element coupled to the second port, wherein the first fractal curve based filter element has first electromagnetic properties and the second fractal curve based filter element has second electromagnetic properties and wherein the first fractal curve based filter element is electromagnetically coupled to the second fractal curve based filter element to filter radio frequency (RF) signals.

2. The filter of claim 1 further comprises:
a substrate, wherein:
the first port is on a first surface of the substrate;
the second port is on the first surface of the substrate;
the first fractal curve based filter element is on the first surface of the substrate; and
the second fractal curve based filter element is on the first surface of the substrate.

3. The filter of claim 2 further comprises:
the first fractal curve based filter element has a geometric shape; and
the second fractal curve based filter element has a minoring geometric shape.

4. The filter of claim 1 further comprises:
band pass filtering the RF signals.

5. The filter of claim 1 further comprises:
the first fractal curve based filter element has a modified Polya curve pattern of an order, rotation angle, and shaping factor; and
the second fractal curve based filter element has a corresponding modified Polya curve pattern of the order, the rotation angle, and the shaping factor.

6. The filter of claim 1 further comprises:
a substrate;
the first fractal curve based filter element including a first segment and a second segment; and
the second fractal curve based filter element including a third segment and a fourth segment, wherein:
the first port is on a first surface of the substrate;
the second port is on the first surface of the substrate;
the first segment of the first fractal curve based filter element is on the first surface of the substrate and coupled to the first port;
the second segment of the first fractal curve based filter element is on a second surface of the substrate and coupled to the first segment of the first fractal curve based filter element by a via;
the first segment of the second fractal curve based filter element is on the first surface of the substrate and coupled to the second port; and
the second segment of the second fractal curve based filter element is on the second surface of the substrate and coupled to the first segment of the second fractal curve based filter element by a second via.

7. The filter of claim 1 further comprises:
the first electromagnetic properties including a first distributed inductance-capacitance-based impedance network over a frequency range; and
the second electromagnetic properties including a second distributed inductance-capacitance-based impedance network over the frequency range.

8. The filter of claim 7 further comprises at least one of:
the first electromagnetic properties being substantially similar to the second electromagnetic properties; and
the first electromagnetic properties being substantially complimentary to the second electromagnetic properties.

9. The filter of claim 1 further comprises at least one of:
a first capacitor coupled to the first fractal curve based filter element to tune the first electromagnetic properties;
a first inductor coupled to the first fractal curve based filter element to tune the first electromagnetic properties;
a second capacitor coupled to the second fractal curve based filter element to tune the second electromagnetic properties; and
a second inductor coupled to the second fractal curve based filter element to tune the second electromagnetic properties.

10. A receiver section comprises:
a low noise amplifier module operable to amplify an inbound radio frequency (RF) signal to produce an amplified inbound RF signal;
a mixing module operable to mix the amplified inbound RF signal with a local oscillation to produce a low frequency mixed signal, wherein the mixing module includes:
an in-phase/quadrature (I/Q) mixer operable to mix the amplified inbound RF signal with an I component of the local oscillation and with a Q component of the local oscillation to produce an IQ mixed signal; and
a mix filtering stage filters the IQ mixed signal to produce the low frequency mixed signal; and
a gain and filter module operable to amplify and filter the down-converted signal to produce an analog baseband signal, wherein the gain and filter module includes a gain stage and a filtering stage, wherein at least one of the mix filtering stage and the filter stage includes at least one filter that includes:
a first port;
a second port;
a first fractal curve based filter element coupled to the first port; and
a second fractal curve based filter element coupled to the second port, wherein the first fractal curve based filter element has first electromagnetic properties and the second fractal curve based filter element has second electromagnetic properties and wherein the first fractal curve based filter element is electromagnetically coupled to the second fractal curve based filter element to filter the low frequency mixed signal.

11. The receiver section of claim 10 further comprises:
a surface wave acoustic (SAW) filter operable to filter the inbound RF signal, wherein the SAW filter includes:
a first SAW port;
a second SAW port;
a first SAW fractal curve based filter element coupled to the first SAW port; and
a second SAW fractal curve based filter element coupled to the second SAW port, wherein the first SAW fractal curve based filter element has first SAW electromagnetic properties and the second SAW fractal curve based filter element has second SAW electromagnetic properties and wherein the first SAW fractal curve based filter element is electromagnetically coupled to the second SAW fractal curve based filter element to filter the inbound RF signal.

12. The receiver section of claim 10 further comprises:
a duplexer that includes a narrow band transmit surface wave acoustic (SAW) filter and a narrow band receive SAW filter, wherein each of the narrow band transmit and receive SAW filters includes:
a first SAW port;
a second SAW port;
a first SAW fractal curve based filter element coupled to the first SAW port; and
a second SAW fractal curve based filter element coupled to the second SAW port, wherein the first SAW fractal curve based filter element has first SAW electromagnetic properties and the second SAW fractal curve based filter element has second SAW electromagnetic properties and wherein the first SAW fractal curve based filter element is electromagnetically coupled to the second SAW fractal curve based filter element to filter the inbound RF signal.

13. The receiver section of claim 10 further comprises:
a substrate, wherein:
the first port is on a first surface of the substrate;
the second port is on the first surface of the substrate;
the first fractal curve based filter element is on the first surface of the substrate; and
the second fractal curve based filter element is on the first surface of the substrate.

14. The receiver section of claim 13 further comprises:
the first fractal curve based filter element has a geometric shape; and
the second fractal curve based filter element has a minoring geometric shape.

15. The receiver section of claim 10 further comprises:
the first fractal curve based filter element has a modified Polya curve pattern of an order, rotation angle, and shaping factor; and
the second fractal curve based filter element has a corresponding modified Polya curve pattern of the order, the rotation angle, and the shaping factor.

16. The receiver section of claim 10 further comprises:
a substrate;
the first fractal curve based filter element including a first segment and a second segment; and
the second fractal curve based filter element including a third segment and a fourth segment, wherein:
the first port is on a first surface of the substrate;
the second port is on the first surface of the substrate;
the first segment of the first fractal curve based filter element is on the first surface of the substrate and coupled to the first port;
the second segment of the first fractal curve based filter element is on a second surface of the substrate and coupled to the first segment of the first fractal curve based filter element by a via;
the first segment of the second fractal curve based filter element is on the first surface of the substrate and coupled to the second port; and
the second segment of the second fractal curve based filter element is on the second surface of the substrate and coupled to the first segment of the second fractal curve based filter element by a second via.

17. A receiver section comprises:
a surface acoustic wave (SAW) filter operable to filter an inbound radio frequency (RF) signal to produce a SAW filtered inbound RF signal, wherein the SAW filter that includes:
a first port;
a second port;
a first fractal curve based filter element coupled to the first port; and
a second fractal curve based filter element coupled to the second port, wherein the first fractal curve based filter element has first electromagnetic properties and the second fractal curve based filter element has second electromagnetic properties and wherein the first fractal curve based filter element is electromagnetically coupled to the second fractal curve based filter element to filter the inbound RF signal;
a low noise amplifier module operable to amplify the SAW filtered inbound RF signal to produce an amplified inbound RF signal;
a mixing module operable to mix the amplified inbound RF signal with a local oscillation to produce a low frequency mixed signal; and
a gain and filter module operable to amplify and filter the down-converted signal to produce an analog baseband signal.

18. The receiver section of claim 17 further comprises:
the SAW filter being a component of a duplexer.

19. The receiver section of claim 17 further comprises:
a substrate, wherein:
the first port is on a first surface of the substrate;
the second port is on the first surface of the substrate;
the first fractal curve based filter element is on the first surface of the substrate; and
the second fractal curve based filter element is on the first surface of the substrate.

20. The receiver section of claim 17 further comprises:
the first fractal curve based filter element has a geometric shape; and
the second fractal curve based filter element has a minoring geometric shape.

21. The receiver section of claim 17 further comprises:
the first fractal curve based filter element has a modified Polya curve pattern of an order, rotation angle, and shaping factor; and
the second fractal curve based filter element has a corresponding modified Polya curve pattern of the order, the rotation angle, and the shaping factor.

22. The receiver section of claim 17 further comprises:
a substrate;
the first fractal curve based filter element including a first segment and a second segment; and
the second fractal curve based filter element including a third segment and a fourth segment, wherein:
   the first port is on a first surface of the substrate;
   the second port is on the first surface of the substrate;
   the first segment of the first fractal curve based filter element is on the first surface of the substrate and coupled to the first port;
   the second segment of the first fractal curve based filter element is on a second surface of the substrate and coupled to the first segment of the first fractal curve based filter element by a via;
   the first segment of the second fractal curve based filter element is on the first surface of the substrate and coupled to the second port; and
   the second segment of the second fractal curve based filter element is on the second surface of the substrate and coupled to the first segment of the second fractal curve based filter element by a second via.

* * * * *

UNITED STATES PATENT AND TRADEMARK OFFICE
CERTIFICATE OF CORRECTION

PATENT NO. : 8,606,207 B2  Page 1 of 1
APPLICATION NO. : 13/031562
DATED : December 10, 2013
INVENTOR(S) : Nicolaos G. Alexopoulos et al.

It is certified that error appears in the above-identified patent and that said Letters Patent is hereby corrected as shown below:

In the Claims:

Col. 18, line 66, in claim 20: after "element has a" replace "minoring" with --mirroring--

Signed and Sealed this
Ninth Day of September, 2014

Michelle K. Lee
*Deputy Director of the United States Patent and Trademark Office*